(12) United States Patent
D'Oria et al.

(10) Patent No.: US 10,960,629 B2
(45) Date of Patent: Mar. 30, 2021

(54) METHOD FOR MANAGING A PLANT FOR LOOPING ANNULAR ANCHORING STRUCTURES AND PLANT FOR LOOPING ANNULAR ANCHORING STRUCTURES

(71) Applicant: Pirelli Tyre S.p.A., Milan (IT)

(72) Inventors: Francesco D'Oria, Milan (IT); Albert Berenguer, Milan (IT); Gian Luigi Bosio, Milan (IT); Christian De Col, Sedico (IT)

(73) Assignee: PIRELLI TYRE S.p.A., Milan (IT)

( * ) Notice: Subject to any disclaimer, the term of this patent is extended or adjusted under 35 U.S.C. 154(b) by 213 days.

(21) Appl. No.: 16/062,067

(22) PCT Filed: Nov. 29, 2016

(86) PCT No.: PCT/IB2016/057181
§ 371 (c)(1),
(2) Date: Jun. 13, 2018

(87) PCT Pub. No.: WO2017/109612
PCT Pub. Date: Jun. 29, 2017

(65) Prior Publication Data
US 2018/0361696 A1    Dec. 20, 2018

(30) Foreign Application Priority Data

Dec. 23, 2015    (IT) .......................... 102015000087417

(51) Int. Cl.
*B32B 41/00*   (2006.01)
*B29D 30/50*   (2006.01)
(Continued)

(52) U.S. Cl.
CPC ......... *B29D 30/50* (2013.01); *B29D 30/0016* (2013.01); *B29D 30/48* (2013.01); *B29D 2030/0044* (2013.01); *B29D 2030/482* (2013.01)

(58) Field of Classification Search
CPC .... B29D 30/50; B29D 30/48; B29D 30/0016; B29D 2030/0044; B29D 2030/482
(Continued)

(56) References Cited

U.S. PATENT DOCUMENTS

2014/0161584 A1    6/2014   Kohnen et al.
2014/0345783 A1*  11/2014   Marchini ........... B29D 30/0016
                                                            156/110.1

FOREIGN PATENT DOCUMENTS

DE    10 2006 051 540 A1    5/2008
DE    10 2002 103066 A1    10/2013
(Continued)

OTHER PUBLICATIONS

International Search Report form the European Patent Office in corresponding International Application No. PCT/IB2016/057181 dated Mar. 22, 2017.
(Continued)

*Primary Examiner* — Michael N Orlando
*Assistant Examiner* — Joshel Rivera
(74) *Attorney, Agent, or Firm* — Finnegan, Henderson, Farabow, Garrett & Dunner, L.L.P.

(57) ABSTRACT

A plant (1) for looping annular anchoring structures (100) includes a looping device (2), a separation station (8a) and a coupling station (8b). A handling apparatus (3) is interlocked to the looping device (2) for managing the plant (1) by moving the plurality of annular anchoring structures (100) coupled to respective separation elements (300), the looped annular anchoring structures (200) coupled to respec-
(Continued)

tive separation elements (300) and the separation elements (300a). The separation elements (300) are fed, coupled to respective annular anchoring structures (100), along a feeding section (A1). The separation elements (300a) separated by respective annular anchoring structures (100, 200) are transferred from the separation station (8a) to the coupling station (8b) along a transfer section (T), stationing in at least a first intermediate station (11, 11a). The separation elements (300) are moved away, coupled to respective looped annular anchoring structures (200), along a moving-apart section (A2).

32 Claims, 4 Drawing Sheets (51) Int. Cl.
*B29D 30/00* (2006.01)
*B29D 30/48* (2006.01)

(58) Field of Classification Search
USPC .................. 156/60, 64, 350, 351, 378, 379
See application file for complete search history.

(56) References Cited

FOREIGN PATENT DOCUMENTS

| EP | 1 000 733 A1 | 5/2000 | |
|---|---|---|---|
| EP | 2 743 069 A1 | 6/2014 | |
| JP | 2002-11806 | 1/2002 | |
| JP | 2003-175555 | 6/2003 | |
| RU | 2177897 C2 | 1/2002 | |
| SU | 758680 A1 | 10/1991 | |
| WO | WO 2010/021546 A1 | 2/2010 | |
| WO | WO 2010/116253 A2 | 10/2010 | |
| WO | WO-2016108100 A1 * | 7/2016 | ............. B29D 30/50 |

OTHER PUBLICATIONS

Written Opinion of the International Searching Authority from the European Patent Office in corresponding International Application No. PCT/IB2016/057181 dated Mar. 22, 2017.
Decision to Grant from the Federal Service for Intellectual Property in a counterpart Russian Application No. 2018125944/05, dated Feb. 18, 2020.
Search Report from the Federal Service for Intellectual Property in a counterpart Russian Application No. 2018125944/05, dated Feb. 18, 2020.

* cited by examiner

METHOD FOR MANAGING A PLANT FOR LOOPING ANNULAR ANCHORING STRUCTURES AND PLANT FOR LOOPING ANNULAR ANCHORING STRUCTURES

This application is a section 371 national phase application based on International Application No. PCT/IB2016/057181, filed Nov. 29, 2016, and claims priority to Italian Patent Application No. IT-102015000087417, filed Dec. 13, 2015; the content of each application is incorporated herein by reference.

The present invention relates to a method for managing a plant for looping annular anchoring structures.

The invention also relates to a plant for looping annular anchoring structures.

The present invention finds application in a process for building tyres for vehicle wheels.

A tyre for vehicle wheels generally comprises a carcass structure comprising at least one carcass ply formed by reinforcement cords embedded in a matrix of elastomeric material. The carcass ply has end flaps respectively engaged with annular anchoring structures. The latter are placed in areas of the tyre usually identified by the name of "beads" and are normally each formed by a substantially circumferential annular element on which at least one filling insert is applied, at a radially outer position. The annular elements are commonly identified as "bead cores" and are designed to keep the tyre well fixed to the anchoring seat specifically provided in the wheel rim, thus preventing, in operation, the escape of the radially inner end flap of the tyre from said seat.

Specific reinforcement structures of the annular anchoring structures may be provided at the beads, referred to as "loops", having the function of improving the torque transmission to the tyre. In fact, the bead region is particularly active in the transmission of torque from the rim to the tyre during acceleration and braking and, therefore, the presence of dedicated reinforcement structures in that area ensures that the torque transmission takes place with the maximum possible reactivity.

A crown structure is associated in a radially outer position to the carcass ply, comprising a belt structure and, in a radially outer position to the belt structure, a tread band made of elastomeric material.

The belt structure comprises one or more belt layers, arranged in radial superposition with respect to each other and having textile or metallic reinforcement cords with crossed orientation and/or substantially parallel to the circumferential development direction of the tyre.

Respective sidewalls of elastomeric material are applied on the lateral surfaces of the carcass structure, each extending from one of the lateral edges of the tread band up at the respective annular anchoring structure to the beads.

The term "loop" is meant to designate an annular element comprising one or more reinforcement thread elements substantially parallel to one another, such as textile or metallic cords, optionally embedded in, or coated with, a layer of elastomeric material, said annular element being obtained by cutting a belt-like element and by mutually joining a head portion and a tail portion of such belt-like element.

The expression "annular anchoring structure" designates a structure formed by a bead core and typically by a filling insert, not reinforced (i.e. not looped).

The term "elastomeric material" is used to designate a composition comprising at least one elastomeric polymer and at least one reinforcement filler. Preferably, such composition further comprises additives such as, for example, a cross-linking agent and/or a plasticiser. Due to the presence of the cross-linking agent, such material can be cross-linked by heating so as to form the final manufactured article.

The terms "radial" and "axial" and the expressions "radially inner/outer" and "axially inner/outer" are used referring to the radial direction and to the axial (or longitudinal) direction of a tyre or a drum used for looping the annular anchoring structures of tyres. The terms "circumferential" and "circumferentially" are instead used with reference to the annular development of said tyre/drum.

The term "separation element" designates an element having a mainly radial extension, for example a planar or slightly frusto-conical element, adapted to be arranged in contact along an axial direction with an annular anchoring structure to preserve the integrity thereof.

The term "separation/coupling station" designates a station in which the annular anchoring structures are uncoupled from a respective separation element and a station in which the looped annular anchoring structures are coupled to a respective separation element, respectively.

The term "configuration" of an element means the orientation or arrangement in space of such element. In particular, the term "horizontal configuration" means an arrangement in space of the separation elements and/or of the annular anchoring structures in which the axial direction is arranged vertically.

The term "stacked" means a superimposed arrangement of the separation elements in which the separation elements themselves are arranged one on the other in a vertical direction, thus defining a stack. Document WO 2010/116253, to the name of the Applicant, provides for the use of two service drums and describes a looping process in which, while the deposition of the loop is carried out on one service drum, the positioning of the annular anchoring structure in a radially outer position to the loop, the folding back of the loop around the annular anchoring structure for forming the reinforced annular anchoring structure as well as the unloading of the latter are carried out on the other service drum. In a subsequent step of the process, the service drums are moved integrally in rotation about the pivoting axis, thereby switching position.

The Applicant has noted that the implementation of a process of the type described in WO 2010/116253 involves a manual management of the annular anchoring structures, at least in the step of feeding said structures to the looping process. In fact, the process described in WO 2010/116253 provides for the use of storage members to ensure the continuity of production of the reinforced annular anchoring structures, on which the annular structures are manually arranged one apart from the other and partially accommodated in grooves provided on the storage members themselves.

The Applicant has further noted that the anchoring annular structures have a high level of adhesion to the surfaces with which they can come into contact and thus the movement of said structures requires that they are appropriately managed, avoiding as much as possible a mutual contact.

The Applicant has felt the need to automate said step of managing the annular anchoring structures, focusing on the complexities arising from possible interactions of the annular structures themselves.

The Applicant has perceived that by presenting the annular structures in a horizontal configuration and coupling the same with a respective separation element it may be possible to automatically manage a looping plant.

In this perspective, the Applicant has further perceived that it may be advantageous to appropriately manage the movement, in particular of the separation elements within the looping plant, in which annular anchoring structures, looped annular anchoring structures and separation elements are simultaneously present. The Applicant has found that it is possible to significantly improve the cycle time of the entire looping plant, simplify the plant itself and improve the flexibility thereof by providing different moving methods of the separation elements coupled to (or separated from) the annular anchoring structures possibly looped and in particular by parking the separation elements separated from the annular anchoring structures during the transfer thereof.

Therefore, in a first aspect thereof, the present invention relates to a method for managing a plant for looping annular anchoring structures.

Preferably, the method includes arranging a plurality of annular anchoring structures coupled to respective separation elements.

Preferably, the method includes separating each annular anchoring structure from the respective separation element for subjecting it to a looping process and obtaining a plurality of looped annular anchoring structures.

Preferably, the method includes coupling each looped annular anchoring structure to a separation element.

Preferably, the method includes moving said separation elements inside the looping plant so that:
along a feeding section, the separation elements are fed, coupled to respective annular anchoring structures,
along a transfer section, the separation elements are transferred from a separation station, arranged along said feeding section, to a coupling station arranged along a moving-apart section,
along said moving-apart section, the separation elements are moved apart, coupled to respective looped annular anchoring structures.

In a second aspect thereof, the present invention relates to a plant for looping annular anchoring structures.

Preferably, the plant includes a looping device of annular anchoring structures for tyres for vehicle wheels.

Preferably, the plant includes a separation station wherein the annular anchoring structures are separated by a respective separation element to be provided to the looping device and obtain a plurality of looped annular anchoring structures.

Preferably, the plant includes a coupling station which receives the looped annular anchoring structures from the looping device and wherein each looped annular anchoring structure is coupled to a separation element.

Preferably, the plant includes a handling apparatus interlocked to the looping device for moving the plurality of annular anchoring structures coupled to respective separation elements, the plurality of looped annular anchoring structures coupled to respective separation elements and the plurality of separation elements.

Preferably, said handling apparatus is said configured for moving said separation elements so that:
along a feeding section, the separation elements are fed, coupled to respective annular anchoring structures,
along a transfer section, the separation elements are transferred from the separation station, arranged along said feeding section, to the coupling station arranged along a moving-apart section,
along said moving-apart section, the separation elements are moved apart, coupled to respective looped annular anchoring structures.

The Applicant believes that by moving the separation element according to the three expected sections, the cycle time of the entire building plant can be significantly reduced and the management thereof simplified.

The present invention, in at least one of the above aspects thereof, can exhibit at least one of the following preferred features, taken individually or in combination with the others.

Preferably, the transfer of said separation elements includes picking up said separation elements from the separation station, moving them along an initial portion of the transfer section up to position them in a first intermediate station.

The Applicant believes that by parking the separation elements separated from the annular anchoring structures during the transfer thereof it is possible to improve the flexibility of the plant and obtain a complete automation.

Preferably, the transfer of said separation elements includes picking up the separation elements from the first intermediate station arranged at the end of the initial portion of the transfer section and moving them along an end portion of the transfer section up to position them in the coupling station.

Preferably, the transfer of said separation elements includes:
moving said separation elements along at least one intermediate portion of the transfer section extending between said first intermediate station arranged at the end of the initial portion of the transfer section and a second intermediate station;
picking up the separation elements from the second intermediate station arranged at the end of the intermediate portion of the transfer section and moving them along an end portion of the transfer section up to position them in the coupling station.

The Applicant believes that the further moving of the separation elements along the transfer section, providing at least two intermediate parking stations, further improves the flexibility of the plant and ensures the proper functioning thereof even at maximum production speeds, minimising the manual intervention from the outside.

Preferably, the transfer of said separation elements includes:
a) picking up one separation element at a time from the separation station, moving it along the initial portion of the transfer section up to position it in the first intermediate station;
b) repeating action a) stacking the separation elements in said first intermediate station;
c) moving said stacked separation elements along said intermediate portion of the transfer section up to position them in the second intermediate station;
d) in said second intermediate station, picking up one separation element at a time from said stacked separation elements and moving it along the end portion of the transfer section up to position it in the coupling station.

The Applicant believes that the management of the stacked separation elements allows optimising the transfer and the adaptability of the plant to different levels of productivity, at the same time simplifying the structure and lay-out thereof.

Preferably, it is provided to buffer said separation elements along said intermediate portion of the transfer section.

The Applicant believes that the buffering along the transfer section simplifies the management of the separation elements.

Preferably, picking up and moving said separation elements along said initial portion of the transfer section are carried out by means of a first picking up device and wherein picking up and moving said separation elements along said end portion of the transfer section are carried out by means of a second picking up device separate from said first picking up device.

The Applicant believes that the use of two different pick-up devices increases the flexibility of the plant and contributes to improve the productivity thereof.

Preferably, moving said separation elements along said initial portion of the transfer section is carried out at least partially simultaneously with the moving of said separation elements along said end portion of the transfer section.

The Applicant believes that the management at least partially simultaneously of certain actions allows improving the productivity of the plant.

Preferably, said separation elements are moved inside the looping plant while keeping a same moving configuration.

Even more preferably, said separation elements are moved inside the looping plant while keeping a same horizontal moving configuration.

The Applicant believes that keeping a same configuration, preferably horizontal, of the separation elements optimises the management and the correct mutual positioning thereof.

Preferably, in order to be fed, said separation elements coupled to said annular anchoring structures are loaded into a feeding station and moved to the separation station.

The Applicant believes that the moving of the separation elements coupled to the annular anchoring structures improves the safety of the plant by allowing to remove the feeding station from the moving members.

Preferably, it is provided to buffer said separation elements coupled to annular anchoring structure along the feeding section. The Applicant believes that the buffering of the separation elements coupled to the annular anchoring structures along the feeding section simplifies the feeding.

Preferably, said separation elements are stacked and alternated with said annular anchoring structures at least in said separation station.

Even more preferably, said separation elements are fed along said feeding section and stacked and alternated with said annular anchoring structures.

The Applicant believes that feeding the annular anchoring structures and the stacked separation elements allows optimising the adaptability of the plant to different levels of productivity, at the same time simplifying the structure and lay-out thereof.

Preferably, it is provided to detect one or more parameters indicative of the quality of the stacking of the separation elements and of the annular anchoring structures.

Even more preferably, it is provided to compare said one or more parameters with at least one reference value.

Even more preferably, it is provided to move away a defective stack from the separation station before separating each annular anchoring structure from the respective separation element.

The Applicant believes that checking the presence of defective stacks during feeding allows the best reconciliation of the quality and productivity requirements.

Preferably, said separation elements are stacked and alternated with said looped annular anchoring structures at least in said coupling station.

Even more preferably, said separation elements are moved away along said moving-apart section and stacked and alternated with said annular anchoring structures.

The Applicant believes that moving away the looped annular anchoring structures and the stacked separation elements allows optimising the adaptability of the plant to different levels of productivity, at the same time simplifying the structure and lay-out thereof.

Preferably, said separation elements coupled to said looped annular anchoring structures are moved from the coupling station by means of a moving-apart conveyor to a moving-apart station.

The Applicant believes that the use of a conveyor, preferably a belt conveyor, simplifies the moving away and improves the safety of the plant by allowing the moving-apart station to be moved away from the moving members.

Preferably, it is provided to detect one or more parameters indicative of the quality of the annular anchoring structures.

Even more preferably, it is provided to compare said one or more parameters with at least one reference value.

Even more preferably, it is provided to move away the defective annular anchoring structures coupled to the respective separation element before separating said defective annular anchoring structure from the respective separation element.

The Applicant believes that checking the presence of defective annular anchoring structures during feeding allows the best reconciliation of the quality and productivity requirements.

Preferably, it is provided to detect one or more parameters indicative of the quality of the looped annular anchoring structures.

Even more preferably, it is provided to compare said one or more parameters with at least one reference value.

Even more preferably, it is provided to move away a looped annular anchoring structure from the coupling station for randomly detecting one or more parameters indicative of the quality of the looped annular anchoring structures. As an alternative, it is provided to move away a defective looped annular anchoring structure from the coupling station following the detection and comparison of said one or more parameters indicative of the quality of the looped annular anchoring structures.

Preferably, the handling apparatus is configured for picking up said separation elements from the separation station and moving them along an initial portion of the transfer section up to position them in a first intermediate station.

Preferably, the handling apparatus is configured for picking up the separation elements from the first intermediate station arranged at the end of the initial portion of the transfer section and moving them along an end portion of the transfer section up to position them in the coupling station.

Preferably, the handling apparatus is configured for moving said separation elements along at least one intermediate portion of the transfer section extending between said first intermediate station arranged at the end of the initial portion of the transfer section and a second intermediate station;

picking up the separation elements from the second intermediate station arranged at the end of the intermediate portion of the transfer section and moving them along an end portion of the transfer section up to position them in the coupling station.

The Applicant believes that by configuring the handling apparatus for moving the separation elements along the transfer section, providing at least two intermediate parking stations, it is possible to further improve the flexibility of the plant and ensure the proper functioning thereof even at maximum production speeds, minimising the manual intervention from the outside.

Preferably, the handling apparatus is configured for:

a) picking up one separation element at a time from the separation station, moving it along the initial portion of the transfer section up to position it in the first intermediate station;

b) repeating action a) stacking the separation elements in said first intermediate station;

c) moving said stacked separation elements along said intermediate portion of the transfer section up to position them in the second intermediate station;

d) in said second intermediate station, picking up one separation element at a time from said stacked separation elements and moving it along the end portion of the transfer section up to position it in the coupling station.

The Applicant believes that a handling apparatus configured for managing the stacked separation elements allows optimising the transfer and the adaptability of the plant to different levels of productivity, at the same time simplifying the structure and lay-out thereof.

Preferably, the handling apparatus includes an intermediate conveyor having a buffering function arranged between said first intermediate station and said second intermediate station.

The Applicant believes that a conveyor, preferably a belt conveyor, simplifies the management of the separation elements along the transfer section and allows predicting the buffering thereof.

Preferably, the handling apparatus includes a first picking up device configured for picking up and moving said separation elements along said initial portion of the transfer section and a second picking up device separate from said first picking up device, said second picking up device being configured for picking up and moving said separation elements along said end portion of the transfer section.

The Applicant believes that two different pick-up devices allow increasing the flexibility of the plant and help improving the productivity thereof.

Preferably, the handling apparatus includes a feeding station in which said separation elements coupled to said annular anchoring structures are loaded and a feeding conveyor having a buffering function configured for moving said separation elements coupled to said annular anchoring structures up to the separation station.

The Applicant believes that a conveyor, preferably a belt conveyor, simplifies the feeding allowing the buffering of the annular anchoring structures coupled to the separation elements and improves the safety of the plant by allowing the feeding station to be moved away from the moving members.

Preferably, the plant includes at least one control unit configured for detecting one or more parameters indicative of the quality of the stacking of the separation elements and of the annular anchoring structures. Even more preferably, the control unit is configured for comparing said one or more parameters with at least one reference value. Even more preferably, the control unit is configured for moving away a defective stack from the separation station before separating each annular anchoring structure from the respective separation element.

Preferably, the plant includes at least one control unit configured for detecting one or more parameters indicative of the quality of the annular anchoring structures. Even more preferably, the control unit is configured for comparing said one or more parameters with at least one reference value. Even more preferably, the control unit is configured for moving away the defective annular anchoring structures coupled to the respective separation element before separating said defective annular anchoring structure from the respective separation element.

The Applicant believes that checking the presence of defective stacks during feeding and/or of defective annular anchoring structures allows the best reconciliation of the quality and productivity requirements.

Preferably, the plant includes at least one scrap conveyor adapted to receive a defective stack or a defective annular anchoring structure and move it away from the plant.

Preferably, said control unit includes a detection element arranged along said feeding section and adapted to detect one or more parameters indicative of the quality of the stacking of the separation elements and of the annular anchoring structures.

Preferably, said handling apparatus includes a moving-apart conveyor adapted to move said separation elements coupled to said looped annular anchoring structures to move them away from the coupling station.

The Applicant believes that the use of a conveyor, preferably a belt conveyor, simplifies the moving away and improves the safety of the plant by allowing the moving-apart station to be moved away from the moving members.

Preferably, said control unit includes a detection element arranged along said feeding section and adapted to detect one or more parameters indicative of the quality of the annular anchoring structures.

Preferably, the plant includes at least one control unit configured for detecting one or more parameters indicative of the quality of the looped annular anchoring structures and comparing said one or more parameters with at least one reference value.

Preferably, said control unit includes a detection element arranged along said moving-apart section and adapted to detect one or more parameters indicative of the quality of the looped annular anchoring structures.

Preferably, the plant includes a scrap conveyor adapted to move away a looped annular anchoring structure from the coupling station for randomly detecting one or more parameters indicative of the quality of the looped annular anchoring structures. Alternatively, the plant includes a scrap conveyor adapted to receive a defective looped annular anchoring structure and move it away from the plant.

Preferably, said looping device includes at least three looping drums, wherein each looping drum has a longitudinal axis thereof and is radially expandable/contractible with respect to said longitudinal axis.

Preferably, said looping device includes a deposition station of a loop including at least one loop dispensing device towards the looping drum.

Preferably, said looping device includes a loading station configured for loading annular anchoring structures on the looping drum including a loading equipment.

Preferably, said looping device includes an unloading station configured for unloading annular anchoring structures from the looping drum including an unloading equipment.

Preferably, said deposition station of the loop, loading station and unloading station are mutually angularly offset.

Preferably, said looping device includes a turret transfer apparatus on which said looping drums are supported in mutually angularly offset positions.

Preferably, said turret transfer apparatus is configured for transferring said looping drums between the deposition station of the loop, the loading station and the unloading station by rotating around a transfer axis.

Preferably, each looping drum is configured for folding back at least partially said loop around said annular anchoring structure during the transfer thereof from said loading station to said unloading station.

Preferably, the plant comprises a protective barrier. Even more preferably, at least the feeding section and the moving-apart section lead outside the protective barrier.

Further features and advantages will become more apparent from the detailed description of a preferred but non-exclusive embodiment of a method of managing a plant for looping annular anchoring structures and of a plant for looping annular anchoring structures according to the present invention.

BRIEF DESCRIPTION OF THE DRAWINGS

Such description is given hereinafter with reference to the accompanying drawings, provided only for illustrative and, therefore, non-limiting purposes, in which.

Figure 3:
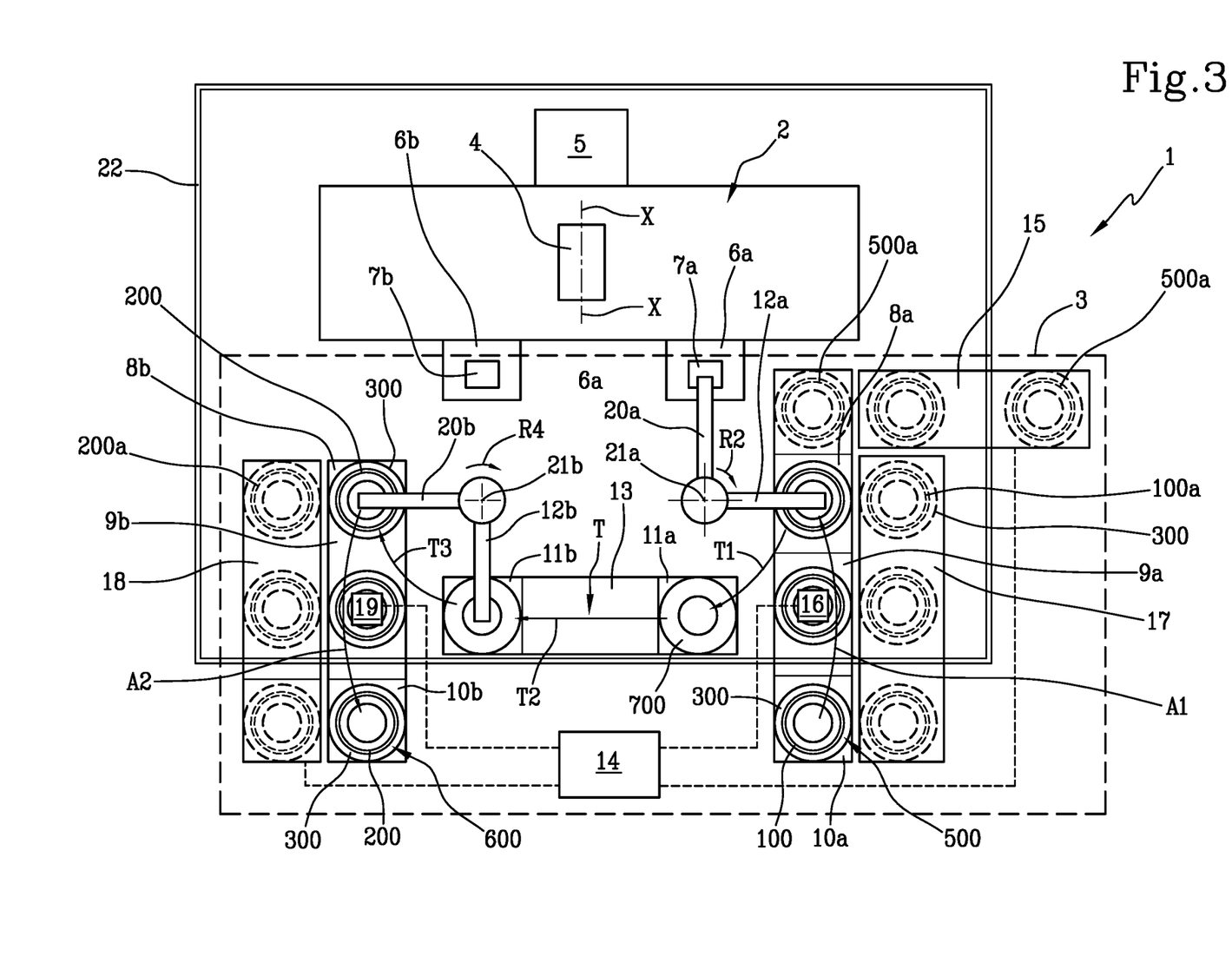
FIGS. 3-5 are schematic plan views of respective possible embodiments of a plant for looping annular anchoring structures according to the present invention.
Figure 4:
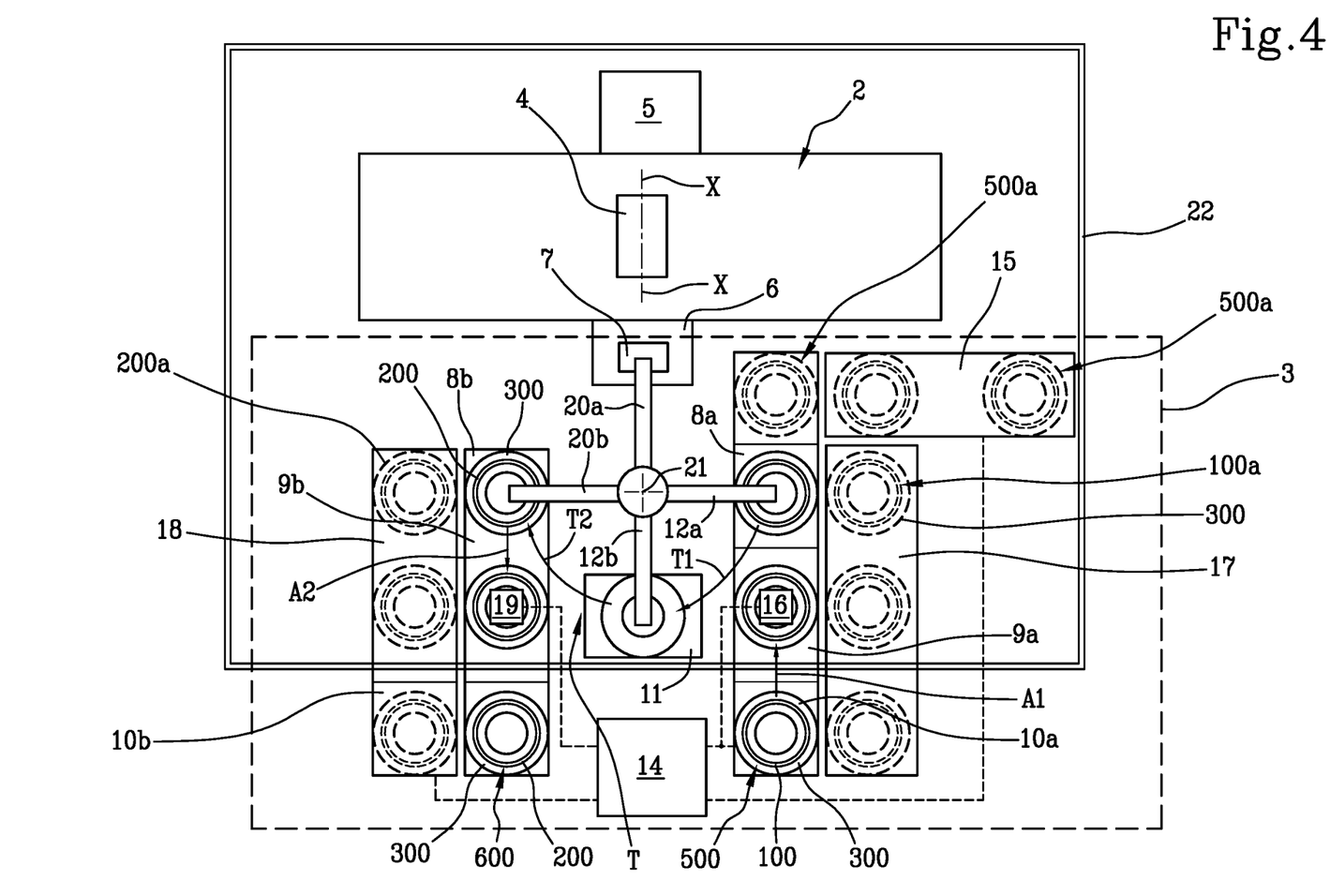
Figure 5:
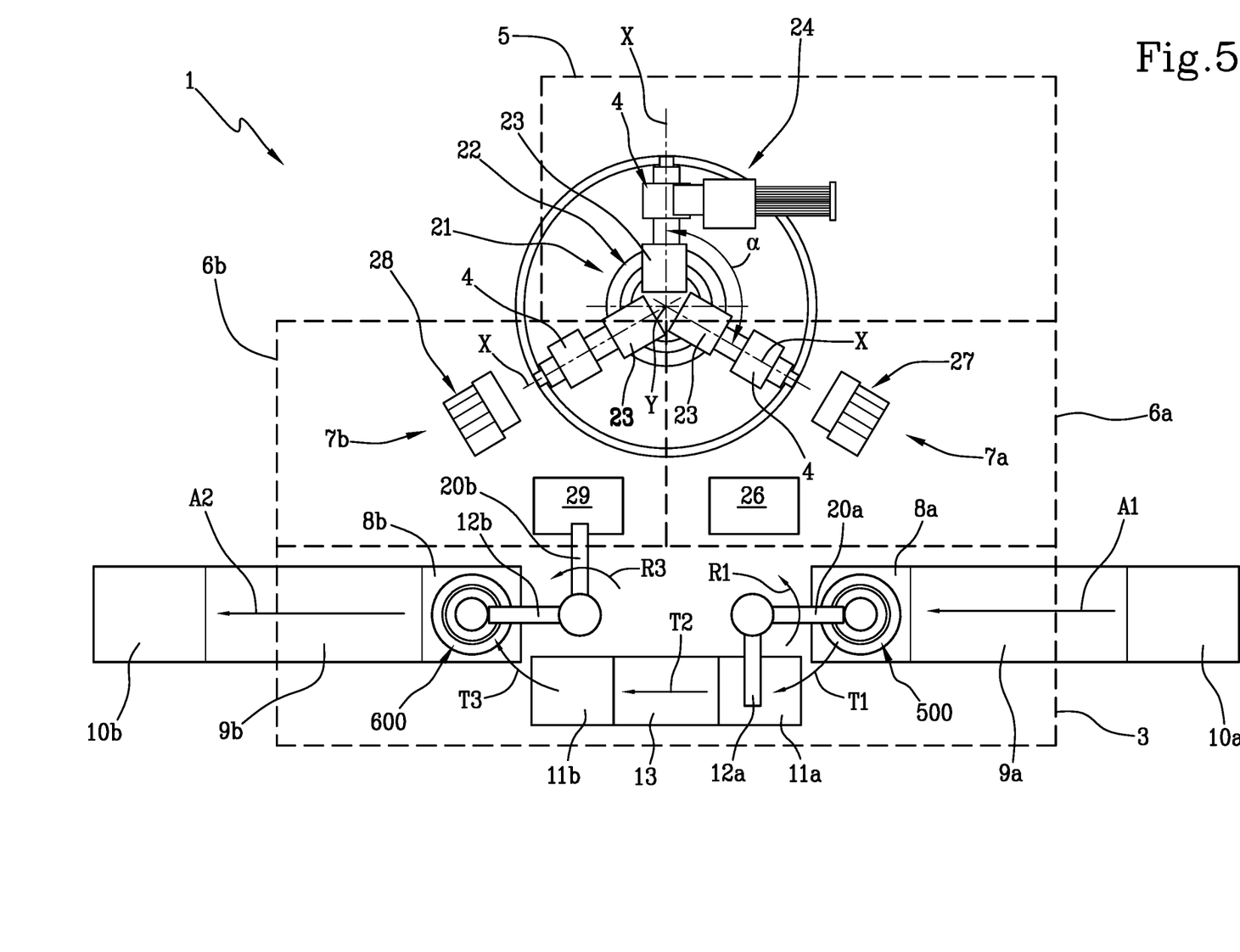

With reference to FIGS. 3-5, reference numeral 1 globally denotes a plant for looping annular anchoring structures, hereinafter briefly referred to as plant 1.

Looping is a process carried out on annular anchoring structures 100 to obtain respective looped annular anchoring structures 200. The latter are used for building carcass structures of tyres.

In particular, they are placed at the tyre beads and are intended to keep the tyre fixed to the anchoring seat specifically provided in the vehicle wheel rim.

Figure 1:
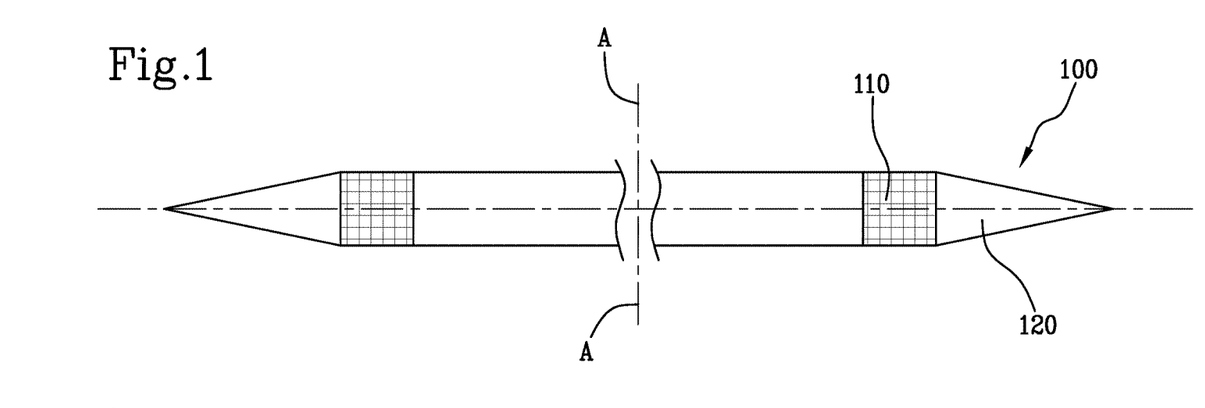
FIG. 1 is a schematic longitudinal sectional view of an annular anchoring structure.

An example of an annular anchoring structure 100 intended to be looped is shown in FIG. 1 and includes a substantially circumferential annular insert 110, also referred to as bead, and a filling insert 120. The filling insert 120 is associated to the annular insert 110 in a radially outer position with respect to the latter. A-A denotes a development axis of the annular anchoring structure 100 defining an axis of symmetry of the bead and of the filling insert.

Figure 2:
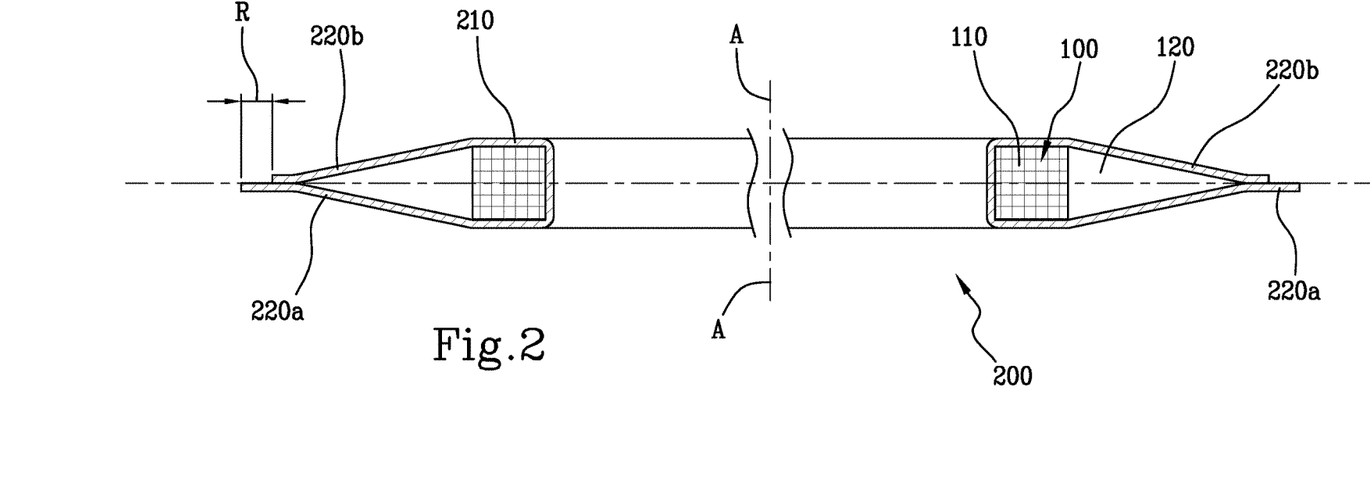
FIG. 2 is a schematic longitudinal sectional view of a looped annular anchoring structure.

An example of an annular anchoring structure 100 is shown in FIG. 2 and includes the annular anchoring structure 100 and a loop 210. A central portion of loop 210 is coupled to the radially inner surface of the annular anchoring structure 100. Opposite flaps 220a, 220b of loop 210 are folded back around the annular anchoring structure 100 so as to surround the latter completely. Preferably, the end portions of the end flaps 220a, 220b of loop 210 are offset in radial direction by a distance R (called "scaling") which may be of between about 4 mm and about 10 mm. Also in the case of the looped annular anchoring structure 200, A-A denotes the development axis.

Plant 1 shown in FIG. 3 is described hereinafter.

Plant 1 includes a looping device 2 and a handling apparatus 3 interlocked to the looping device 2 for moving a plurality of annular anchoring structures 100 coupled to respective separation elements 300, a plurality of looped annular anchoring structures 200 coupled to respective separation elements 300 and a plurality of separation elements 300a separated from the annular anchoring structures 100. In the following description and in the accompanying drawings, the separation elements separated from the annular anchoring structures 100 are indicated with reference numeral 300a.

The looping device 2 preferably operates by means of at least one looping drum 4. The looping drum 4 has a longitudinal axis X-X thereof about which the looping drum extends concentrically.

According to a possible embodiment, the looping drum 4 can be radially expandable/contractible with respect to the longitudinal axis X-X in order to fold back loop 210 around the annular anchoring structure 100.

Plant 1 includes at least one loop deposition station 5 in which the loop is loaded on the looping device 2, preferably on the looping drum 4, a loading station 6a in which the annular anchoring structures 100 are loaded on the looping device 2, preferably on the looping drum 4, and an unloading station 6b in which the looped annular anchoring structures 200 are unloaded from the looping device 2, preferably from the looping drum 4.

The loading station 6a includes a loading equipment 7a configured for receiving the annular anchoring structures 100 from the handling apparatus 3 and loading them on the looping device 2.

The unloading station 6a includes an unloading equipment 7b configured for receiving the looped annular anchoring structures 200 from the looping device 2 and providing them to the handling apparatus 3.

The handling apparatus 3 includes a separation station 8a wherein the annular anchoring structures 100 are separated by a respective separation element 300 to be provided to the looping device 2.

The handling apparatus includes a coupling station 8b which receives the looped annular anchoring structures 200 from the looping device 2 and wherein each looped annular anchoring structure 200 is coupled to a separation element 300.

The handling apparatus 3 is configured for moving the separation elements along a first section or feeding section "A1", a second section or transfer section "T" and a third section or moving-apart section "A2".

The separation station 8a is arranged along the feeding section "A1" and the coupling station 8b is arranged along the moving-apart section "A2".

Along the feeding section "A1", the separation elements 300 are fed, coupled to respective annular anchoring structures 100. The handling apparatus 3 includes a feeding conveyor 9a having also a buffering function and configured for moving the separation elements 300 coupled to the annular anchoring structures 100 up to the separation station 8a. The handling apparatus 3 includes a feeding station 10a in which the separation elements 300 coupled to the annular anchoring structures 100 are loaded. The feeding conveyor 9a connects the feeding station 10a and the separation station 8a.

The separation elements 300 are stacked and alternated with the annular anchoring structures 100 at least in the separation station 8a, preferably the separation elements 300 are fed along the feeding section "A1" stacked and alternated with the annular anchoring structures 100, for example starting from the feeding station 10a. Reference numeral 500 designates a stack of separation elements 300 stacked and alternated with the annular anchoring structures 100.

Along the moving-apart section A2, the separation elements 300 are moved apart, coupled to respective looped annular anchoring structures 200. The handling apparatus 3 includes a moving-apart conveyor 9b configured for moving the separation elements 300 coupled to the looped annular anchoring structures 200 for moving them away from the coupling station 8b, for example to a moving-apart station 10b.

The separation elements 300 are stacked and alternated with the looped annular anchoring structures 200 at least in the coupling station 8b, preferably the separation elements 300 are moved away along the moving-apart section "A2" stacked and alternated with the looped annular anchoring structures, for example up to the moving-apart station 10b. Reference numeral 600 designates a stack of separation elements 300 stacked and alternated with the looped annular anchoring structures 200.

Along the transfer section "T", the separation elements 300a (separated from respective annular anchoring structures 100) are transferred from the separation station 8a to the coupling station 8b, parking in at least a first intermediate station 11a arranged along the transfer section "T". For example, the separation elements 300a are transferred from the separation station 8a to the coupling station 8b, parking in a first intermediate station 11a and in a second intermediate station 11b arranged along the transfer section "T".

The handling apparatus 3 is configured for picking up the separation elements 300a from the separation station 8a and moving them along an initial portion "T1" of the transfer section "T" up to position them in the first intermediate station 11a. The first intermediate station 11a is arranged at the end of the initial portion "T1" of the transfer section "T". To this end, the handling apparatus 3 may include a first picking up device 12a configured for picking up and moving the separation elements 300a along the initial portion "T1" of the transfer section "T" up to position them in the first intermediate station 11a.

The handling apparatus 3 is configured for moving the separation elements 300a along at least one intermediate portion "T2" of the transfer section "T" extending between the first intermediate station 11a and the second intermediate station 11b. The second intermediate station 11b is arranged at the end of the intermediate portion "T2" of the transfer section "T". To this end, the handling apparatus 3 may include an intermediate conveyor 13 having a buffering function arranged between the first intermediate station 11a and the second intermediate station 11b and configured moving the separation elements 300a along the intermediate portion "T2" of the transfer section "T" up to position them in the second intermediate station 11b.

The handling apparatus 3 is configured for picking up the separation elements 300a from the second intermediate station 11b and moving them along an end portion "T3" of the transfer section "T" up to position them in the coupling station 8b. To this end, the handling apparatus 3 may include a second picking up device 12b configured for picking up and moving the separation elements along the end portion "T3" of the transfer section "T". The second picking up device 12b is preferably separate from the first picking up device 12a. The second picking up device 12b may be structurally and functionally similar to the first picking up device 12a.

Preferably, the handling apparatus 3 is configured for:

a) picking up one separation element 300a at a time from the separation station 8a, moving it along the initial portion T1 of the transfer section T up to position it in the first intermediate station 11a;

b) repeating action a) stacking the separation elements 300a in the first intermediate station 11a, thereby forming a stack 700;

c) moving the stacked separation elements 300a along the intermediate portion T2 of the transfer section T up to position them in the second intermediate station 11b;

d) picking up one separation element 300a at a time from the second intermediate station 11b and moving it along the end portion T3 of the transfer section T up to position it in the coupling station 8b.

Plant 1 includes at least one control unit 14 configured for managing any defects of the annular anchoring structures 100 and/or of the looped annular anchoring structures 200 and/or of the stack of annular anchoring structures 100 and separation elements 300.

For example, the control unit 14 is configured for detecting one or more parameters indicative of the quality of the stacking of the separation elements 300 and of the annular anchoring structures 100, comparing such parameters with at least one reference value and moving away a defective stack 500a from the separation station 8a before separating each annular anchoring structure 100 from the respective separation element 300. A scrap conveyor 15 may therefore be provided, adapted to receive a defective stack 500a and move it away from the plant. For example, the control unit 14 includes a detection element 16 arranged along the feeding section "A1" and adapted to detect one or more parameters indicative of the quality of the stacking of the separation elements 300 and of the annular anchoring structures 100. The detection element 16 may be arranged alternately on the first picking up device 12a.

For example, the control unit 14 is configured for detecting one or more parameters indicative of the quality of the annular anchoring structures 100, comparing such parameters with at least one reference value and moving away the defective annular anchoring structures 100a coupled to the respective separation element 300 before separating the defective annular anchoring structure 100a from the respective separation element 300. A scrap conveyor 17 may therefore be provided, adapted to receive a defective annular anchoring structure 100a and move it away from plant 1. For example, the control unit 14 includes a detection element arranged along the feeding section "A1" and adapted to detect one or more parameters indicative of the quality of the annular anchoring structures 100. Preferably, the same detection element 16 may be adapted to detect one or more parameters indicative of the quality of the stacking of the separation elements 300 and of the annular anchoring structures 100 and one or more parameters indicative of the quality of the annular anchoring structures 100. The detection element 16 may be arranged alternately on the first picking up device 12a.

For example, the control unit 14 is configured for detecting one or more parameters indicative of the quality of the looped annular anchoring structures and comparing such parameters with at least one reference value. A scrap conveyor 18 may therefore be provided, adapted to receive a defective looped annular anchoring structure 200a and move it away from plant 1. For example, the control unit 14 includes a detection element 19 arranged along the moving-apart section "A2" and adapted to detect one or more parameters indicative of the quality of the looped annular anchoring structures 200. The detection element 19 may be arranged alternately on the second picking up device 12b.

The scrap conveyor 18 may be used to move away a looped annular anchoring structure 200 from the coupling station 8b for randomly detecting one or more parameters indicative of the quality of the looped annular anchoring structures 200.

Plant 1 includes a loading device 20a operating between the separation station 8a and the loading equipment 7a for picking up and transferring the annular anchoring structures 100 to be subjected to looping.

Plant 1 includes an unloading device 20b operating between the unloading equipment 7b and the coupling station 8b for picking up and transferring the looped annular anchoring structures 200.

Preferably, the loading device 20a is separate from the unloading device 20b. The loading device 20a may be structurally and functionally similar to the unloading device 20b.

Preferably, the first picking up device 12a and the loading device 20a are mounted rotating around a same axis of rotation 21a, preferably so as to be integral during rotation about such axis of rotation 21a.

Preferably, the second picking up device 12b and the unloading device 20b are mounted rotating around a same axis of rotation 21b, preferably so as to be integral during rotation about such axis of rotation 21b.

Reference numeral 22 designates a protective barrier that surrounds plant 1, for example consisting of walls and access doors or sensors and photocells. At least the feeding section "A1" and the moving-apart section "A2" lead outside the protective barrier 22.

The annular anchoring structures 100 coupled to respective separation elements 300 are first arranged in plant 1. Preferably, a stack of separation elements 500 stacked and alternated with the annular anchoring structures 100 is provided for example at the feeding station 10a.

The annular anchoring structures 100 coupled to respective separation elements 300 are fed by the feeding conveyor 9a along the feeding section "A1" up to the separation station 8a, in which the loading device 20a picks up each annular anchoring structure 100, separating it from the respective separation element 300, preferably from stack 500.

The annular anchoring structures 100 picked up from the separation station 8a are transferred to the loading station 6a and introduced into the looping device 2 to be subjected to a looping process.

The looped annular anchoring structures 200 obtained from the looping process are picked up from the unloading station 6b by means of the unloading device 20b which transfers them to the coupling station 8b.

In the coupling station 8b, the looped annular anchoring structures 200 are coupled to respective separation elements 300, preferably forming a stack 600 of separation elements 300 stacked and alternated with the looped annular anchoring structures 200.

From the coupling station, the looped annular anchoring structures 200 are moved away from the moving-apart conveyor 9b along the moving-apart section "A2" up to the moving-apart station 10b.

The management of plant 1 provides for moving the separation elements inside plant 1 according to the feeding section "A1", the transfer section "T" and the moving-apart section "A2". In particular, such management provides for feeding the separation elements 300 coupled to respective annular anchoring structures 100 along the feeding section, transferring the separation elements 300a (separated from respective annular anchoring structures 100) from the separation station 8a to the coupling station 8b along the transfer section and moving away the separation elements 300 coupled to respective looped annular anchoring structures 200 along the moving-apart section.

The first picking up device 12a picks up the separation elements 300a from the separation station 8a and moves them along an initial portion "T1" of the transfer section "T" up to position them in the first intermediate station 11a.

Preferably, the first picking up device 12a picks up a separation element 300a at a time, for example from a stack 500.

The intermediate conveyor 13 moves the separation elements 300a along the intermediate portion "T2" of the transfer section "T" up to the second intermediate station 11b.

In the passage between the first picking up device 12a and the intermediate conveyor 13, the separation elements 300a are parked in the first intermediate station 11a. Preferably, the first picking up device 12a repeats the action of picking up and transferring the separation elements 300a from the separation station 8a so as to stack them in the first intermediate station 11a, thereby forming a stack 700 before the intermediate conveyor transfers them stacked to the second intermediate station 11b.

The second picking up device 12b picks up the separation elements 300a from the second intermediate station 11b and moves them along the end portion "T3" of the transfer section "T" up to position them in the coupling station 8b.

In the passage between the intermediate conveyor 13 and the second picking up device 12b, the separation elements 300a are parked in the second intermediate station 11b. Preferably, the second picking up device picks up one separation element 300a at a time from the separation elements stacked in the second intermediate station 11b and moves it along the end portion "T3" of the transfer section "T" up to position it in the coupling station 8b.

The moving of the separation elements 300a along the initial portion "T1" of the transfer section "T" is carried out at least partially simultaneously with the moving of the separation elements 300a along the end portion "T3" of the transfer section "T".

The separation elements are moved inside plant 1 while keeping a same moving configuration, preferably horizontal.

Checks may be provided in the management of plant 1 for detecting any defects of the annular anchoring structures 100 and/or of the looped annular anchoring structures 200 and/or of the stack of annular anchoring structures 100 and separation elements 300.

Preferably, the control unit 14 detects one or more parameters indicative of the quality of the stacking of the separation elements and of the annular anchoring structures, compares such parameters with at least one reference value and moves away a defective stack 500a from the separation station 8a along the scrap conveyor 15 before separating each annular anchoring structure from the respective separation element.

Preferably, the control unit 14 detects one or more parameters indicative of the quality of the annular anchoring structures, compares such parameters with at least one reference value and moves away the defective annular anchoring structures 100a coupled to the respective separation element along the scrap conveyor 17 before separating the defective annular anchoring structure from the respective separation element.

Preferably, the control unit 14 moves away a looped annular anchoring structure 200 from the coupling station 8b for randomly detecting one or more parameters indicative of the quality of the looped annular anchoring structures and comparing such parameters with at least one reference value.

In detail, in the plant in FIG. 3, an annular anchoring structure 100 is picked up from stack 500 by means of the loading device 20a, carried in rotation (arrow R1—FIG. 5) to the loading station 6a and provided to the looping device 2, for example fitted on the looping drum 4 in radially outer position with respect to loop 210 already deposited.

During the rotation of the loading device 20a (arrow R1—FIG. 5), the first picking up device 12a rotates, for example integral, up to reach the separation station 8a (position shown in FIG. 3) for picking up a separation element 300 while the loading device 20a transfers the annular anchoring structure 100 to the loading station 6a.

After picking up a separation element 300 from the separation station 8a, the first picking up device 12a rotates (arrow R2—FIG. 3) for transferring the separation element to the first intermediate station 11a 20a while the loading device 20a rotates, for example integral, up to return to the separation station 8a (position shown in FIG. 5).

In order to unload the looped annular anchoring structure 200, the latter is transferred from the looping device 2, preferably from the looping drum 4, into the unloading station 6b, then picked up by the unloading device 20b which, set in rotation (arrow R3—FIG. 5), positions it into the coupling station 8b.

During the rotation of the unloading device 20b (arrow R3—FIG. 5), the second picking up device 12b rotates, for example integral, up to reach the second intermediate station 11b (position shown in FIG. 3) for picking up a separation element 300a while the unloading device 20b transfers the looped annular anchoring structure 200 to the coupling station 8b.

Then, the second picking up device 12b rotates (arrow R4—FIG. 3) for transferring the separation element from the second intermediate station 11b while the unloading device 20b rotates, for example integral, up to return to the unloading station 6b (position shown in FIG. 5).

According to a possible embodiment, shown for example in FIG. 4, the loading station and the unloading station coincide in a single loading and unloading station 6 and include a single loading and unloading equipment 7.

Preferably, the first picking up device 12a, the second picking up device 12b, the loading device 20a and the unloading device 20b are mounted rotating around a same axis of rotation 21, preferably so as to be integral in the rotation about such axis of rotation 21.

Preferably, the transfer section includes only the first intermediate station 11a, an intermediate portion of the transfer section not being provided. In other words, the handling apparatus 3 is configured for picking up the separation elements 300a from the first intermediate station 11a arranged at the end of the initial portion "T1" of the transfer section and moving them along the end portion "T3" of the transfer section up to position them in the coupling station 8a.

In detail, an annular anchoring structure 100 is picked up from stack 500 by means of the loading device 20a, carried in rotation to the loading and unloading station 6 (counter clockwise direction) and provided to the looping device 2, for example fitted on the looping drum 4 in radially outer position with respect to loop 210 already deposited.

During the rotation of the loading device 20a, the first picking up device 12a rotates, for example integral, after positioning a separation element 300a in the intermediate station 11 up to reach the separation station 8a to pick up another separation element 300a.

During the rotation of the loading device 20a, the unloading device 20b that has picked up a looped annular anchoring structure 200 from the loading and unloading station 6 rotates, for example integral, up to reach the coupling station 8b.

During the rotation of the loading device 20a, the second picking up device 12b rotates, for example integral, after positioning a separation element 300a in the coupling station 8b up to reach the intermediate station 11 to pick up another separation element 300a.

Thereafter, the loading device 20a rotates (clockwise rotation) after positioning an annular anchoring structure 100 in the loading and unloading station 6 up to return into the separation station 8a.

During the rotation of the loading device 20a, after having picked up a separation element 300 from the separation station 8a, the first picking up device 12a rotates, for example integral, for transferring the separation element to the first intermediate station 11.

During the rotation of the loading device 20a, the unloading device 20b rotates, for example integral, after having positioned a looped annular structure 200 in the coupling station up to return at the loading and unloading station 6.

During the rotation of the loading device 20a, the second picking up device 12b rotates for transferring the separation element 300a from the intermediate station 11 to the coupling station 8b. In the plant in FIG. 1, the transfer of the separation elements 300a includes picking up the separation elements 300a from the separation station 8a, moving them along an initial portion "T1" of the transfer section "T" up to position them in the first intermediate station 11, picking up the separation elements 300a from the first intermediate station 11 arranged at the end of the initial portion "T1" of the transfer section "T" and moving them along a final portion "T3" of the transfer section "T" up to position them in the coupling station 8a.

According to a possible embodiment, shown for example in FIG. 5, the looping device 2 includes at least three looping drums 4. Each looping drum 4 has a longitudinal axis X-X thereof about which the looping drum extends concentrically.

Each looping drum 4 is radially expandable/contractible with respect to the longitudinal axis X-X in order to fold back loop 210 around the annular anchoring structure 100.

The looping device 2 includes a turret transfer apparatus 21 arranged centrally with respect to the deposition station of the loop 5, to the loading station 6a and to the unloading station 6b. The deposition station of the loop 5, the loading station 6a and the unloading station 6b are mutually angularly offset.

The turret transfer apparatus 21 is configured for supporting the looping drums 4 in positions mutually angularly offset, according to said stations. According to the example shown, the angular offset α between the positions of the looping drums 4 is equal to about 120°.

The turret transfer apparatus 21 is configured for transferring the looping drums 4 between the deposition station of the loop 5, the loading station 6a and the unloading station 6b by rotating around a substantially vertical transfer axis Y. In particular, the looping drums 4 are supported by the turret transfer apparatus 21 with substantially horizontal longitudinal axis X-X.

The turret transfer apparatus 21 includes a rotatable table 22 that supports each looping drum 4 through a respective drum holder turret 23.

The deposition station of the loop 5 includes at least one loop dispensing device 24 configured for dispensing loop 210 towards the looping drum 4. The loop dispensing device 24 may comprise at least one reel of continuous elongated material which, when cut, defines loop 210. The loop dispensing device 24 may include a cutting and deposition unit 25 configured for supporting and centring loop 210 prior to dispensing by positioning it on the looping drum 4.

In the loop deposition station 5, the looping drum 4 is placed in rotation around the longitudinal axis X-X for depositing the flat loop 210 on the radially outer surface thereof.

The loading station 6a includes a loading equipment 7a configured for loading the annular anchoring structures 100 on the looping drum 4.

An example of loading equipment 7a, shown in FIG. 5, includes a loading handling device 26 configured for centring the annular anchoring structure 100 before the same is loaded on the looping drum 4. In particular, the loading handling device 26 is configured for receiving the annular anchoring structure 100 and bringing it to a loading configuration, i.e. with the development axis A-A parallel to a longitudinal axis X-X of a looping drum at the loading station.

The loading handling device 26 may include sensors adapted to check the correct diameter of the annular anchoring structure picked up and a plurality of picking up fingers radially movable with respect to the development axis A-A in a synchronous and self-centring manner in order to retain the annular anchoring structure at radially inner portions.

The loading handling device 26 is preferably multi-fitting and does not require a manual set-up upon size change.

An example of loading equipment 7a, shown in FIG. 5, includes a loader 27, also multi-fitting, configured for transferring the annular anchoring structures on the looping drum 4 with a movement coaxial to the longitudinal axis X-X thereof.

The loading handling device 26 may be configured for rotating the annular anchoring structures 100 from the feeding configuration to the loading configuration. In particular, the loading handling device 26 may be configured for rotating each annular anchoring structure 100 by 90°.

The unloading station 6a includes an unloading equipment 7b configured for unloading the looped annular anchoring structures 200 from the looping drum 4 arranged in the loading station 6b. In particular, the unloading station 6b may be substantially specular with respect to the loading station 6a.

An example of unloading equipment 7b, shown in FIG. 4, includes an unloader 28 configured for receiving the looped annular anchoring structure 200 with the axis of development A-A parallel to a longitudinal axis X-X of the looping drum and a loading handling device 29 which may be structurally similar to the loading handling device 26.

The unloading handling device 29 may be configured for rotating each looped annular anchoring structure 200 from an unloading configuration to a moving-apart configuration different from the unloading configuration. In particular, the unloading handling device 29 may be configured for rotating each annular anchoring structure 200 by 90°.

With reference to the plant in FIG. 5, a looping cycle of the looping process includes depositing loop 210 on an annular portion of the outer annular surface of a looping drum 4, at the deposition station of the loop 5.

At least partially simultaneously with the deposition of the loop in the deposition station of the loop 5, the looping cycle includes, at the loading station 6a, the loading of an annular anchoring structure 100 on a looping drum 4 different from that arranged in the deposition station of the loop 5, in radially outer position to a loop 210 already deposited.

At least partially simultaneously with the deposition of the loop in the deposition station of the loop 5 and with the loading of the annular anchoring structure 100 in the loading station 6a, the looping cycle includes, at the unloading station 6b, the unloading of the looped annular anchoring structure 200 from a looping drum 4 different from those respectively arranged in the deposition station of the loop 5 and in the loading station 6a.

The looping cycle further includes transferring each looping drum 5 between the deposition station of the loop 5, the loading station 6a and the unloading station 6b.

The looping cycle further includes folding back each of the opposite end flaps 200a, 220b of loop 210 on the annular anchoring structure 100 so as to form a looped annular anchoring structure 200. This action is preferably carried out at least partly while transferring a looping drum 4 from the loading station 6a to the unloading station 6b.

Starting from a looping drum 4 arranged in the deposition station of the loop 5, loop 210 is deposited. The turret transfer apparatus 21 completes a 120° rotation and transfers the looping drum 4 from the deposition station of the loop 5 to the loading station 6b.

Meanwhile, the annular anchoring structures 100 are fed in the feeding configuration stacked and alternated with the separation elements 300. In particular, one stack 500 is present in the separation station 8a. In order to be loaded on the looping drum 4 arranged in the loading station 6a, an annular anchoring structure 100 is picked up from stack 100 by means of the loading device 20a, transported in rotation on the loading handling device 26 which centres it, transferred by the latter to loader 27 and fitted on the looping drum 4 in radially outer position with respect to loop 210 already deposited.

During the rotation of the loading device 20a (arrow R1—FIG. 5), the first picking up device 12a rotates, for example integral, up to reach the separation station 8a (position shown in FIG. 3) for picking up a separation element 300 while the loading device 20a transfers the annular anchoring structure 100 to the loading handling device 26.

The turret transfer apparatus 21 then completes a further 120° rotation and transfers the looping drum 4 from the loading station 6a to the unloading station 6b. During this transfer, each of the opposite end flaps 220a, 220b of loop 210 is folded back on the annular anchoring structure 100 by the effect of a radial expansion/contraction of the looping drum 4.

Meanwhile, the first picking up device 12a rotates (arrow R2—FIG. 3) for transferring the separation element to the first intermediate station 11a 20a while the loading device 20a rotates, for example integral, up to return to the separation station 8a (position shown in FIG. 5).

When the drum has reached the unloading station 6b, in order to unload the looped annular anchoring structure 200, the latter is transferred from the looping drum 4 on the unloader 28, then from unloader 28 to the unloading handling device 29, then picked up by the unloading device 20b which, set in rotation (arrow R3—FIG. 5), positions it into the coupling station 8b.

During the rotation of the unloading device 20b (arrow R3—FIG. 5), the second picking up device 12b rotates, for example integral, up to reach the second intermediate station 11b (position shown in FIG. 3) for picking up a separation element 300a while the unloading device 20b transfers the looped annular anchoring structure 200 to the coupling station 8b.

Then, the second picking up device 12b rotates (arrow R4—FIG. 3) for transferring the separation element from the second intermediate station 11b while the unloading device 20b rotates, for example integral, up to return at the unloading handling device 29 (position shown in FIG. 5).

The management of plant 1 in FIG. 5 is similar to that described for the plant in FIG. 3. Although not explicitly described and illustrated, the plant in FIG. 5 may include a control unit and unloading conveyors similar to those described with reference to FIG. 3.

As an alternative to what has been described and illustrated, the feeding and/or moving-apart conveyors may be not provided or provided with a different shape or lay-out.

In this case, the feeding section is represented by any feeding method to the plant, even manual, such as to position the annular anchoring structures and the respective separation elements in the separation station. Likewise, the moving-apart section is represented by any moving-apart method from the plant, even manual, such as to move the annular anchoring structures and the respective separation elements away from the separation station.

The invention claimed is:

1. A method for managing a plant for looping annular anchoring structures comprising:
    arranging a plurality of annular anchoring structures coupled to respective separation elements;
    separating each annular anchoring structure from the respective separation element for subjecting each annular structure to a looping process and obtaining a plurality of looped annular anchoring structures;
    coupling each looped annular anchoring structure to respective separation elements; and
    moving said separation elements inside the plant for looping, wherein the moving step comprises:
        feeding the separation elements which are coupled to respective annular anchoring structures along a feeding section;
        transferring the separation elements along a transfer section from a separation station, arranged along said feeding section, to a coupling station arranged along a moving-apart section; and
        moving the separation elements coupled to respective looped annular anchoring structures apart using said moving-apart section.

2. The method for managing a plant for looping annular anchoring structures according to claim 1, wherein transferring said separation elements comprises:
    picking up said separation elements from the separation station and moving said separation elements along an initial portion of the transfer section up to position said separation elements in a first intermediate station.

3. The method for managing a plant for looping annular anchoring structures according to claim 2, wherein transferring said separation elements further comprises picking up the separation elements from the first intermediate station arranged at the end of the initial portion of the transfer section and moving the separation elements along an end portion of the transfer section up to position the separation elements in the coupling station.

4. The method for managing a plant for looping annular anchoring structures according to claim 2, wherein transferring said separation elements further comprises:
    moving said separation elements along at least one intermediate portion of the transfer section extending between said first intermediate station arranged at the end of the initial portion of the transfer section and a second intermediate station;
    picking up the separation elements from the second intermediate station arranged at the end of the intermediate portion of the transfer section; and
    moving the separation elements along an end portion of the transfer section up to position the separation elements in the coupling station.

5. The method for managing a plant for looping annular anchoring structures according to claim 3, wherein transferring said separation elements further comprises:
    a) picking up one separation element at a time from the separation station, moving the separation element along the initial portion of the transfer section up to position the separation element in the first intermediate station;
    b) repeating action a) stacking the separation elements in said first intermediate station;
    c) moving said stacked separation elements along said intermediate portion of the transfer section up to position said stacked separation elements in the second intermediate station;
    d) in said second intermediate station, picking up one separation element at a time from said stacked separation elements and moving the separation element along the end portion of the transfer section up to position the separation element in the coupling station.

6. The method for managing a plant for looping annular anchoring structures according to claim 3, further comprising buffering said separation elements along said intermediate portion of the transfer section.

7. The method for managing a plant for looping annular anchoring structures according to claim 2, wherein picking up and moving said separation elements along said initial portion of the transfer section is carried out by a first picking up device and wherein picking up and moving said separation elements along said end portion of the transfer section is carried out by a second picking up device separate from said first picking up device.

8. The method for managing a plant for looping annular anchoring structures according to claim 3, wherein moving said separation elements along said initial portion of the transfer section is carried out at least partially simultaneously with the moving of said separation elements along said end portion of the transfer section.

9. The method for managing a plant for looping annular anchoring structures according to claim 1, wherein said separation elements are moved inside the looping plant while keeping a same moving configuration.

10. The method for managing a plant for looping annular anchoring structures according to claim 1, wherein feeding the separation elements coupled to said annular anchoring structures are loaded into a feeding station and moved to the separation station.

11. The method for managing a plant for looping annular anchoring structures according to claim 10, further comprising buffering said separation elements coupled to said annular anchoring structures along the feeding section.

12. The method for managing a plant for looping annular anchoring structures according to claim 1, wherein said separation elements are stacked and alternating with said annular anchoring structures at least in said separation station.

13. The method for managing a plant for looping annular anchoring structures according to claim 12, further comprising:
    detecting one or more parameters of the quality of the stacking of the separation elements and of the annular anchoring structures,
    comparing said one or more parameters with at least one reference value of the separation elements and of the annular anchoring structures, moving away a defective stack from the separation station before separating each annular anchoring structure from the respective separation element.

14. The method for managing a plant for looping annular anchoring structures according to claim 1, wherein said separation elements are stacked and alternating with said looped annular anchoring structures at least in said coupling station.

15. The method for managing a plant for looping annular anchoring structures according to claim 1, wherein moving the separation elements along said moving-apart section and said separation elements coupled to said looped annular anchoring structures are moved from the coupling station by a moving-apart conveyor up to a moving-apart station.

16. The method for managing a plant for looping annular anchoring structures according to claim 1, further comprising:
    detecting one or more parameters of the quality of the annular anchoring structures,
    comparing said one or more parameters with at least one reference value of the annular anchoring structure,
    moving away the defective annular anchoring structures coupled to the respective separation element before separating said defective annular anchoring structure from the respective separation element.

17. The method for managing a plant for looping annular anchoring structures according to claim 1, further comprising:
    detecting one or more parameters of the quality of the looped annular anchoring structures,
    comparing said one or more parameters with at least one reference value of the looped annular anchoring structure.

18. The method for managing a plant for looping annular anchoring structures according to claim 17, further comprising moving away the looped annular anchoring structures from the coupling station for randomly detecting one or more parameters of the quality of the looped annular anchoring structures or moving away a defective looped annular anchoring structure from the coupling station following the detection and comparison of said one or more parameters of the quality of the looped annular anchoring structures.

19. A plant for looping annular anchoring structures comprising:
    a looping device of annular anchoring structures for tyres for vehicle wheels;
    a separation station, wherein the annular anchoring structures are uncoupled from respective separation elements and provided to the looping device to obtain a plurality of looped annular anchoring structures;
    a coupling station, wherein the coupling station receives the looped annular anchoring structures from the looping device and wherein each looped annular anchoring structure becomes coupled to a separation element; and
    a handling apparatus, interlocked to the looping device, for moving the plurality of annular anchoring structures coupled to respective separation elements, the plurality of looped annular anchoring structures coupled to respective separation elements, and the plurality of separation elements; and
    wherein said handling apparatus moves said separation elements and
    feeds the separation elements, coupled to respective annular anchoring structures, along a feeding section,
    transfers the separation elements along a transfer section from the separation station, arranged along said feeding section, to the coupling station arranged along a moving-apart section, and
    moves apart the separation elements, along said moving-apart section, coupled to respective looped annular anchoring structures.

20. The plant for looping annular anchoring structures according to claim 19, wherein said handling apparatus picks up said separation elements from the separation station and moves them along an initial portion of the transfer section up to position said separation elements in a first intermediate station.

21. The plant for looping annular anchoring structures according to claim 20, wherein said handling apparatus moves said separation elements along at least one intermediate portion of the transfer section extending between said first intermediate station arranged at the end of the initial portion of the transfer section and a second intermediate station; and
    picks up the separation elements from the second intermediate station arranged at the end of the intermediate portion of the transfer section and moves the separation elements along an end portion of the transfer section up to position the separation elements in the coupling station.

22. The plant for looping annular anchoring structures according to claim 20, wherein said handling apparatus comprises an intermediate conveyor having a buffering function arranged between said first intermediate station and said second intermediate station.

23. The plant for looping annular anchoring structures according to claim 20, wherein said handling apparatus comprises a first picking up device for picking up and moving said separation elements along said initial portion of the transfer section and a second picking up device separate from said first picking up device, wherein said second picking up device picks up and moves said separation elements along said end portion of the transfer section.

24. The plant for looping annular anchoring structures according to claim 19, wherein said handling apparatus comprises a feeding station, wherein the feeding station in which said separation elements coupled to said annular anchoring structures are loaded and a feeding conveyor having a buffering function moves said separation elements coupled to said annular anchoring structures up to the separation station.

25. The plant for looping annular anchoring structures according to claim 19, further comprising at least one control unit for detecting one or more parameters of the quality of the annular anchoring structures, the quality of the stacking of the separation elements and of the annular anchoring structures or the quality of the looped annular anchoring structures, for comparing said one or more parameters with at least one reference value and moving away a defective stack from the separation station before separating each annular anchoring structure from the respective separation element and for moving away the defective annular anchoring structures coupled to the respective separation element before separating said defective annular anchoring structure from the respective separation element.

26. The plant for looping annular anchoring structures according to claim 24, further comprising at least one scrap conveyor, wherein the at least one scrap conveyor receives a defective stack or a defective annular anchoring structure and moves it away from the plant.

27. The plant for looping annular anchoring structures according to claim 25, wherein the control unit comprises a detection element arranged along said feeding section and detects one or more parameters of the quality of the annular anchoring structures, the quality of the stacking of the separation elements, and of the annular anchoring structures.

28. The plant for looping annular anchoring structures according to claim 19, wherein said handling apparatus comprises a moving-apart conveyor wherein the moving-apart conveyor moves said separation elements coupled to said looped annular anchoring structures away from the coupling station and moves said separation elements to a moving-apart station.

29. The plant for looping annular anchoring structures according to claim according to claim 25, wherein the control unit comprises a detection element arranged along said moving-apart section, wherein the detection element detects one or more parameters of the quality of the looped annular anchoring structures.

30. The plant for looping annular anchoring structures according to claim 29, further comprising a scrap conveyor wherein the scrap conveyor receives a defective looped annular anchoring structure and moves the defective looped annular anchoring structure away from the plant.

31. The plant for looping annular anchoring structures according to claim 19, wherein said looping device comprises:

at least three looping drums, wherein each looping drum has a longitudinal axis thereof and is radially expandable/contractible with respect to said longitudinal axis;

a deposition station of a loop, wherein the deposition station comprises at least one loop dispensing device oriented towards the looping drum;

a loading station for loading annular anchoring structures on the looping drum comprising a loading equipment;

an unloading station for unloading looped annular anchoring structures from the looping drum comprising an unloading equipment;

a turret transfer apparatus supporting said looping drums in mutually angularly offset positions, wherein said turret transfer apparatus transfers said looping drums between the deposition station of the loop, the loading station, and the unloading station by rotating around a transfer axis;

wherein said deposition station of the loop, the loading station, and the unloading station are mutually angularly offset.

32. The plant for looping annular anchoring structures according to claim 19, further comprising a protective barrier and wherein at least the feeding section and the moving-apart section lead outside the protective barrier.

* * * * *